(12) United States Patent
Stikeleather

(10) Patent No.: US 7,726,345 B2
(45) Date of Patent: Jun. 1, 2010

(54) METALLIC STRIP AND METHODS AND STRUCTURES INCORPORATING THE SAME

(76) Inventor: Allan Stikeleather, 25 Greenlodge St., Canton, MA (US) 02021

( * ) Notice: Subject to any disclaimer, the term of this patent is extended or adjusted under 35 U.S.C. 154(b) by 0 days.

(21) Appl. No.: 12/201,319

(22) Filed: Aug. 29, 2008

(65) Prior Publication Data

US 2009/0056824 A1 Mar. 5, 2009

Related U.S. Application Data

(63) Continuation of application No. PCT/US2007/074567, filed on Jul. 27, 2007.

(60) Provisional application No. 60/820,563, filed on Jul. 27, 2006, provisional application No. 60/825,424, filed on Sep. 13, 2006.

(51) Int. Cl.
*F16L 11/08* (2006.01)

(52) U.S. Cl. .................. 138/129; 138/154; 138/150; 138/177; 138/135; 174/109; 165/179

(58) Field of Classification Search ................ 138/134, 138/135, 154, 129, 150; 174/109; 165/179
See application file for complete search history.

(56) References Cited

U.S. PATENT DOCUMENTS

| | | | |
|---|---|---|---|
| 494,972 A | 4/1893 | Weigand | 138/134 |
| 559,968 A | 5/1896 | Brooks | 138/134 |
| 712,418 A | 10/1902 | Rudolph | 138/135 |
| 769,366 A | 9/1904 | Waterman | 138/135 |
| 996,999 A | 7/1911 | Mulconroy et al. | 138/134 |
| 1,485,394 A | 3/1924 | Haynes | 138/134 |
| 1,779,592 A | 10/1930 | Goodll | 138/134 |
| 2,086,152 A | 7/1937 | Bedell | 138/134 |
| 2,739,089 A * | 3/1956 | Hageltorn | 428/121 |
| 3,199,541 A | 8/1965 | Richitelli | 138/129 |
| 3,340,900 A * | 9/1967 | Spurlock | 138/136 |
| 4,209,043 A | 6/1980 | Menzel | 138/154 |
| 4,304,816 A | 12/1981 | Bright et al. | 428/358 |
| 4,383,555 A * | 5/1983 | Finley | 138/129 |
| 4,788,089 A * | 11/1988 | Skipper | 428/34.9 |

(Continued)

OTHER PUBLICATIONS

PCT Search Report dated Jul. 3, 2008 for International Patent Application No. PCT/US07/74567 filed Jul. 27, 2007.

*Primary Examiner*—Patrick F Brinson
(74) *Attorney, Agent, or Firm*—Grossman, Tucker, Perreault & Pfleger, PLLC

(57) ABSTRACT

A flexible cable may include an elongated shaped strip helically wound around itself to form a generally tubular body having at least one interior passageway and at least one conductor at least partially disposed within the interior passageway. The elongated shaped strip may include a non-rectangular cross-sectional thickness having a central portion disposed between a first and a second end portion. The first and second end portions may extend generally outwardly from the central portion from generally opposite sides. At least a portion of the central portion may include a cross-sectional thickness $T_C$ which is less than a maximum cross-sectional thickness $T_M$ of the elongated shaped strip. The first and second end portions may include a first and a second cross-section thickness $T_{S1}$, $T_{S2}$, respectively, wherein at least one of the first and second cross-section thicknesses $T_{S1}$, $T_{S2}$ is greater than the cross-sectional thickness $T_C$.

13 Claims, 8 Drawing Sheets

U.S. PATENT DOCUMENTS

| | | | |
|---|---|---|---|
| 5,074,138 A * | 12/1991 | Miller | 72/49 |
| 5,329,973 A | 7/1994 | Kanao | 138/154 |
| 5,660,912 A * | 8/1997 | Menzel | 428/99 |
| 5,730,188 A * | 3/1998 | Kalman et al. | 138/135 |
| 6,032,702 A | 3/2000 | Bearden | 138/166 |
| 6,907,906 B1 | 6/2005 | Cook et al. | 138/109 |
| 2004/0216796 A1* | 11/2004 | Fukui et al. | 138/129 |

* cited by examiner

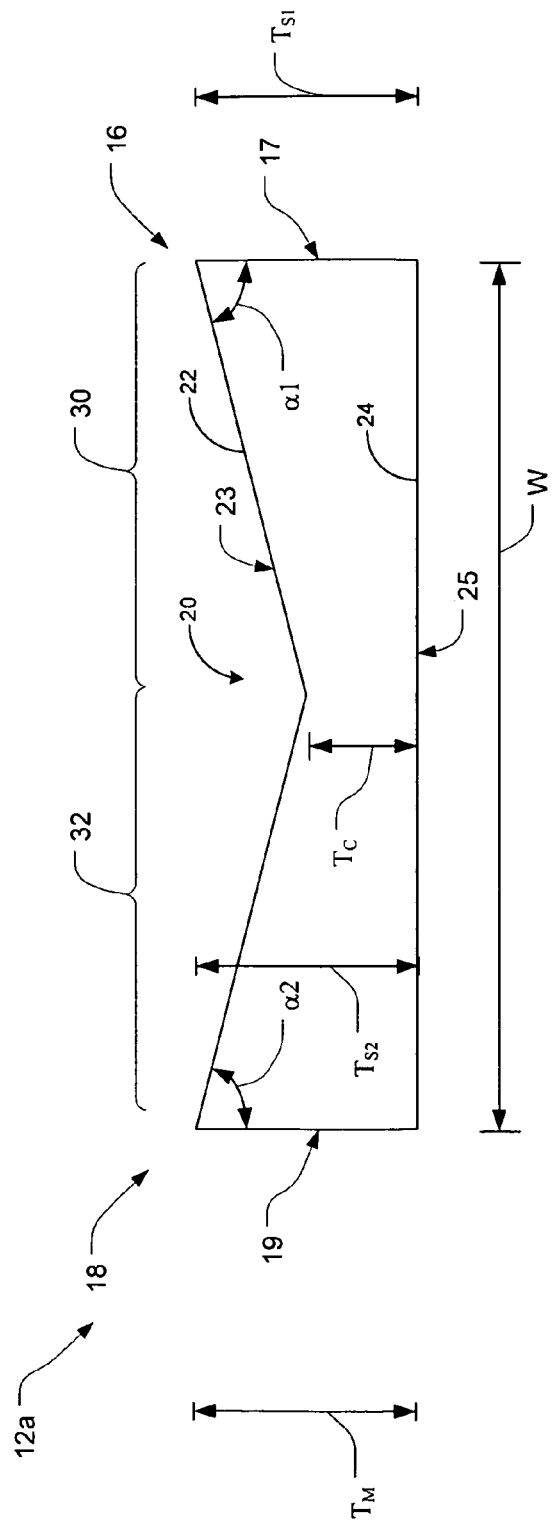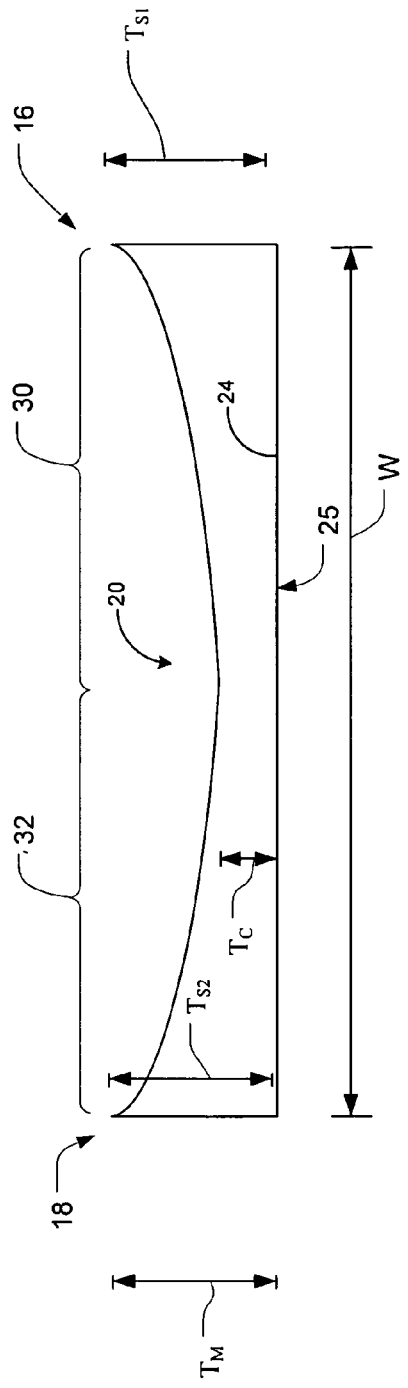

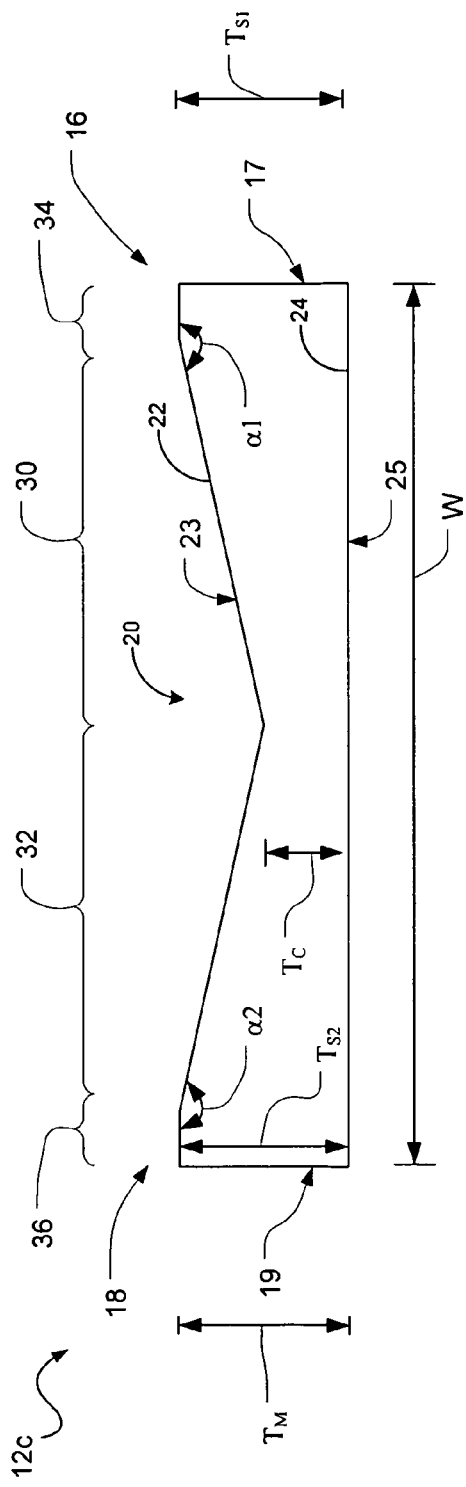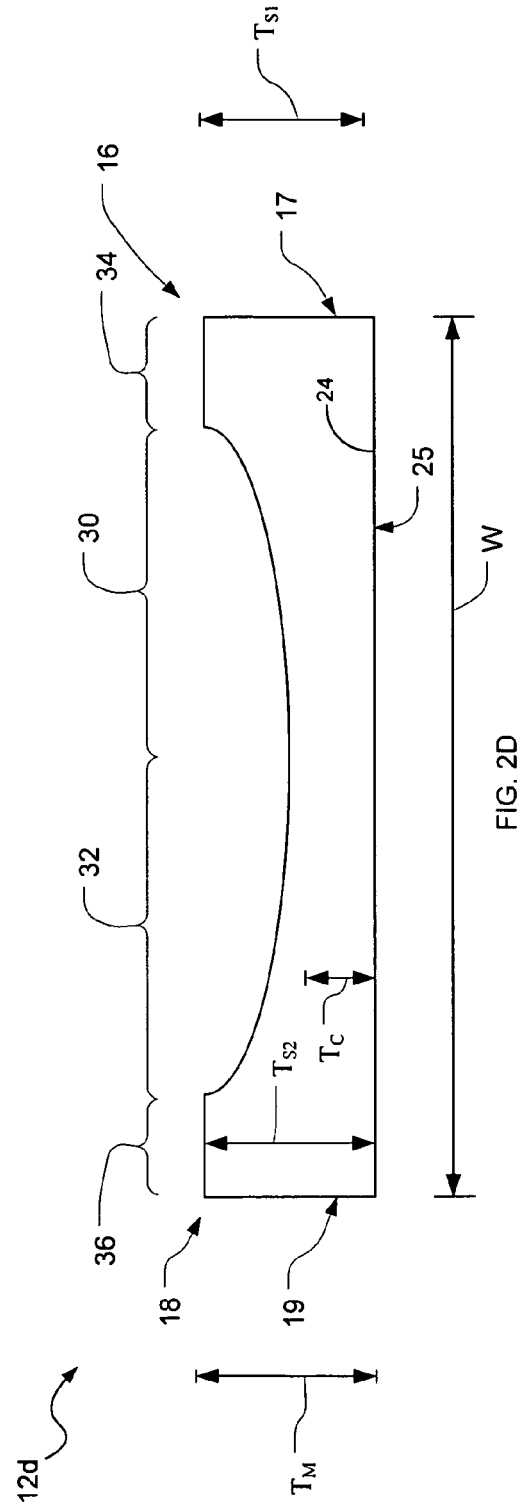

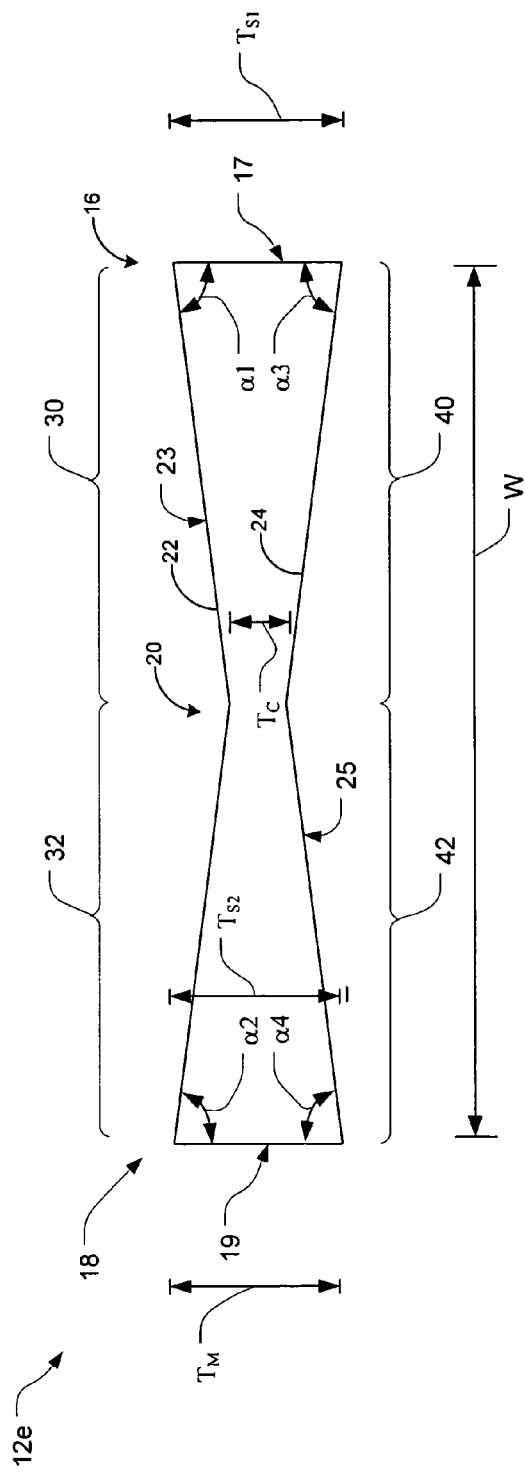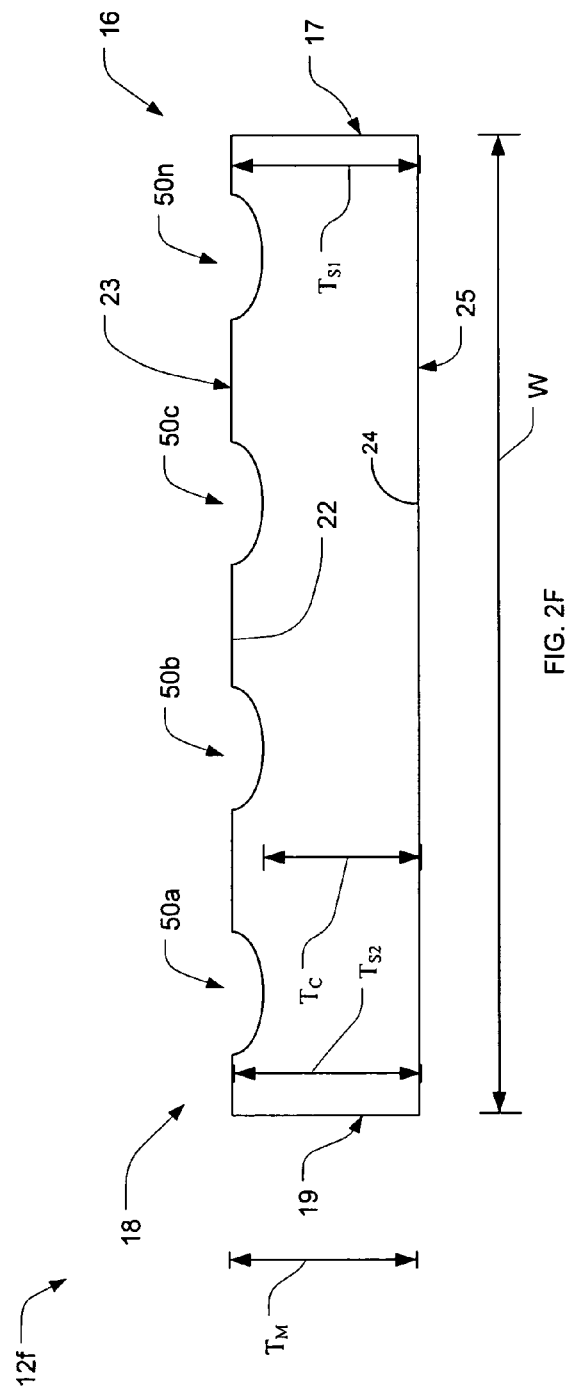

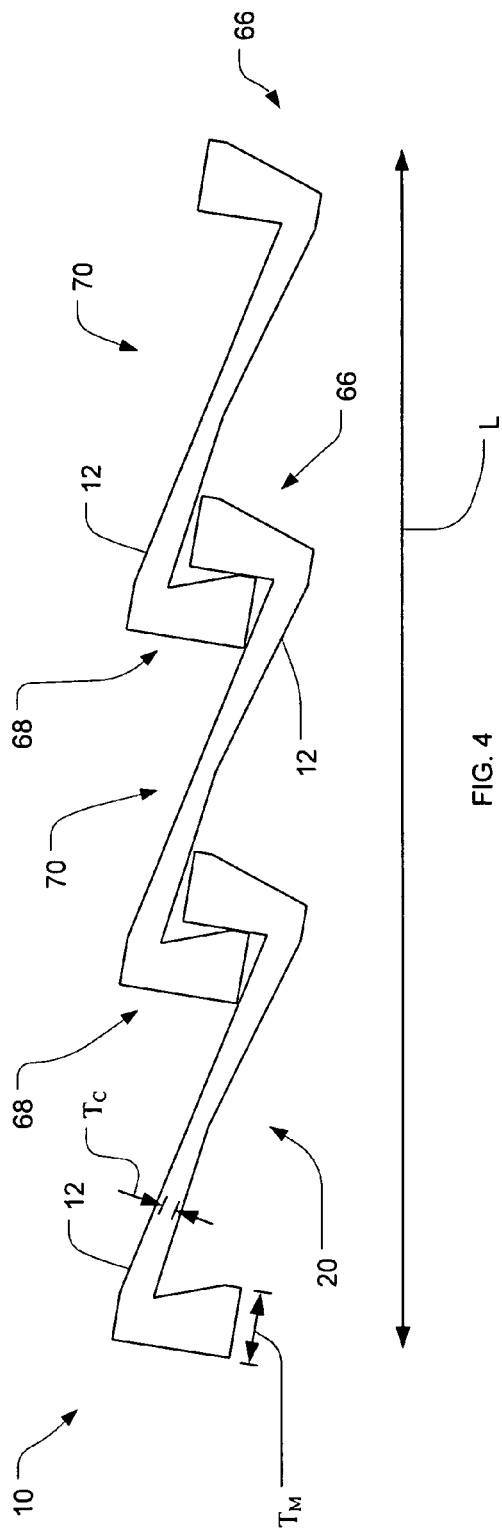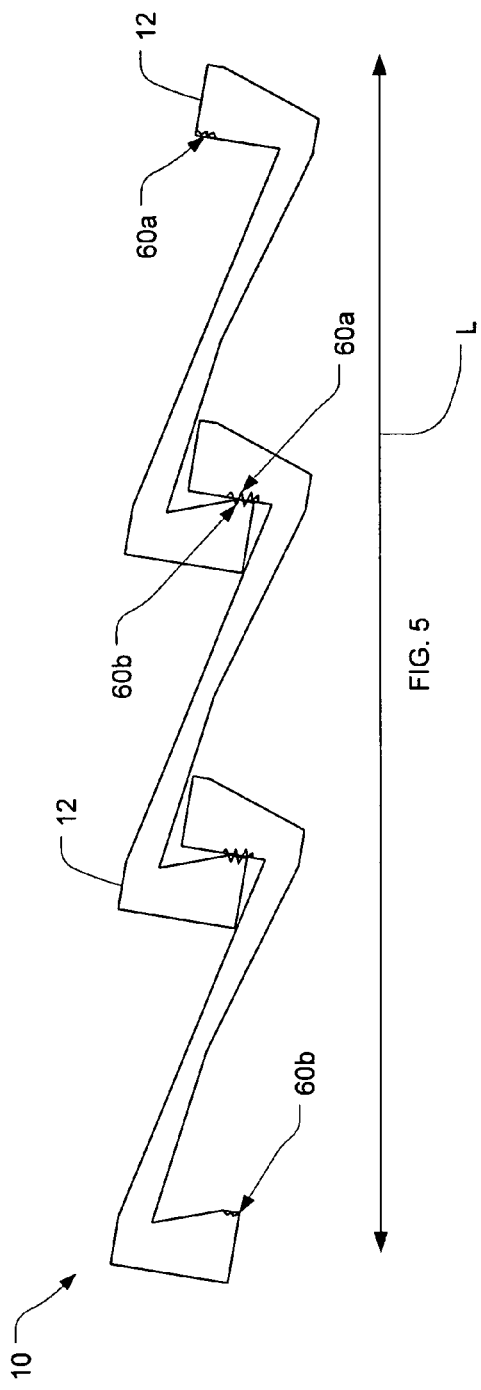

METALLIC STRIP AND METHODS AND STRUCTURES INCORPORATING THE SAME

CROSS-REFERENCE TO RELATED APPLICATIONS

This application is a continuation of International Patent Application No. PCT/US2007/074567, filed on Jul. 27, 2007, designating the U.S. and claiming the benefit of U.S. Provisional Patent Application Ser. No. 60/820,563 filed on Jul. 27, 2006 and U.S. Provisional Application Ser. No. 60/825,424 filed on Sep. 13, 2006, the teachings of which applications are fully incorporated herein by reference.

FIELD

The present disclosure generally relates to metallic strips, and more particularly relates to a metallic strip as well as structures and methods incorporating the same.

BACKGROUND

Flexible metallic conduit may be used for a variety of purposes. In one configuration, flexible metal conduit may be provided as a sheathing covering several electrical conductors in an armored cable. For example, flexible metal conduit may be produced by forming a metallic strip into an interlocking geometry and helically winding the strip.

A metallic strip may also be used in the construction of a heat exchanger tube. In a heat exchanger tube, the metallic strip may be helically wound around and exterior surface of a metallic tube. In known constructions, the tube may have a circular cross-section and the strip may be a solid construction of rectangular cross section. The fin may be integral with, or secured to, the outer surface of the tube.

The cost of flexible metal conduit, heat exchanger tubes and other metallic constructions may be reduced by reducing the amount of metallic material, e.g. aluminum or copper, in the metallic strips from which they formed. The amount of metallic material in the strips, however, may be balanced with mechanical performance requirements, e.g. related to pull strength and crush resistance, imposed by various regulatory adjacencies and organizations such as, but not limited to, Underwriters Laboratories (UL). Reduction in the amount of material in the strips can affect the mechanical properties of the cable and/or heat exchanger to the extent that it will not pass UL requirements.

It is important to note that the present disclosure is not intended to be limited to a system or method which must satisfy one or more of any stated objects or features of the present disclosure. It is also important to note that the present disclosure is not limited to the preferred, exemplary, or primary embodiment(s) described herein. Modifications and substitutions by one of ordinary skill in the art are considered to be within the scope of the present disclosure, which is not to be limited except by the following claims.

BRIEF DESCRIPTION OF THE DRAWINGS

Features and advantages of the present disclosure will be apparent from the following description of embodiments consistent therewith, which description should be considered in conjunction with the accompanying drawings, wherein:

FIG. 2A is a cross-sectional view of a shaped metallic strip for forming flexible metal cable having a concaved central portion consistent with the present disclosure.

FIG. 2B is a cross-sectional view of another shaped metallic strip for forming flexible metal cable having a concaved central portion consistent with the present disclosure.

FIG. 2C is a cross-sectional view of a shaped metallic strip for forming flexible metal cable having a concaved central portion extending from a first and a second extended region consistent with the present disclosure.

FIG. 2D is a cross-sectional view of another shaped metallic strip for forming flexible metal cable having a concaved central portion extending from a first and a second extended region consistent with the present disclosure.

FIG. 2E is a cross-sectional view of a shaped metallic strip for forming flexible metal cable having a concaved upper and lower portion consistent with the present disclosure.

FIG. 2F is a cross-sectional view of a shaped metallic strip for forming flexible metal cable having a plurality of concaved central portions along the width of the metallic strip consistent with the present disclosure.

FIG. 4 is a sectional view of a portion of a flexible metal cable consistent with the present disclosure.

FIG. 5 is another sectional view of a portion of a flexible metal cable consistent with the present disclosure in which the elongated flexible strip includes interlocking portions.

DESCRIPTION

Figure 1:
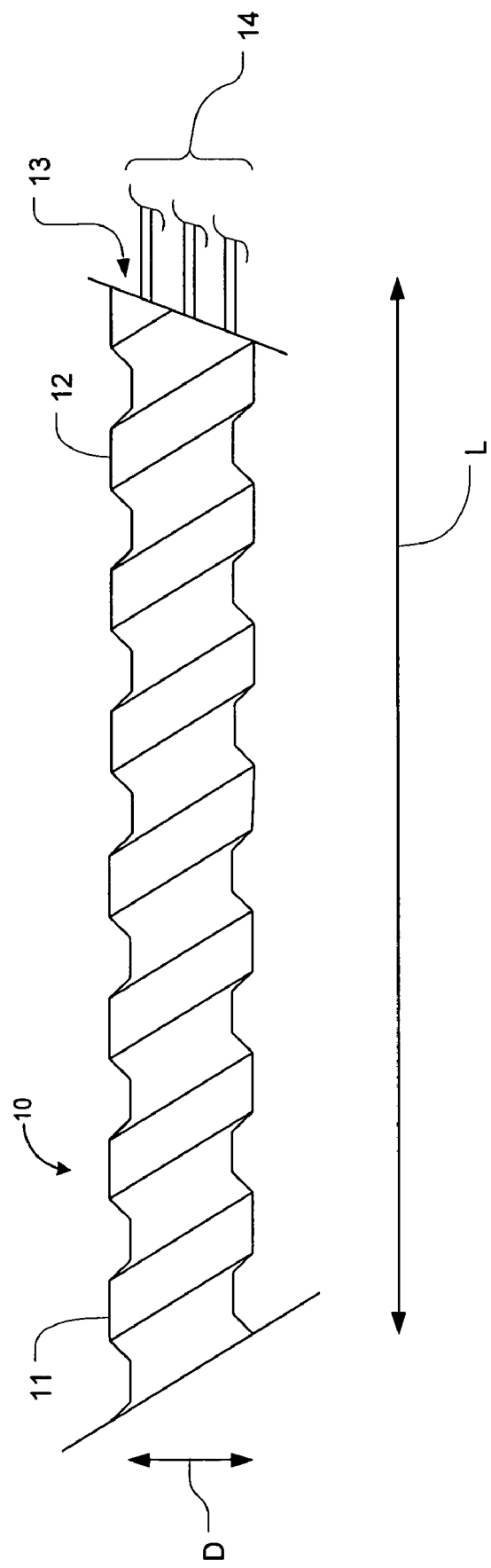
FIG. 1 schematically depicts a section of armored cable constructed in a manner consistent with the present disclosure.

With reference to FIG. 1, for example, there is illustrated a section of flexible cable 10 that may be used as sheathing in an armored cable or the like. The flexible cable 10 may include a generally tubular body 11 defining at least one interior passageway 13 configured to at least partially receive at least one conductor 14 such as, but not limited to, an insulated electrical conductor, optical fiber, wires, cables, or the like. The flexible cable 10 may be formed by roll forming an elongated shaped strip 12 having a non-rectangular cross-section into various shapes (such as, but not limited to, an "S" or "Z" shape) and then forcing the elongated shaped strip 12 through a curling die such that continuous helical interlocking of shaped strip convolutions is achieved. The flexible cable 10 having an elongated shaped strip 12 with a non-rectangular cross-sectional geometry according to the present disclosure may reduce the cross-sectional area of the elongated shaped strip 12 compared to the known rectangular metal strips, thereby reducing the amount of material, and thus the cost, of the elongated shaped strip 12 required to make the flexible cable 10 having substantially the same overall length L and internal diameter D as the known cables.

FIGS. 2A-2E illustrate several cross-sectional geometries of an elongated shaped strip 12a-12e prior to application through a curling die which may be used to form the flexible cable 10. In general, the elongated shaped strip 12 may have a width W and a maximum overall thickness $T_M$, wherein at least a portion disposed between the first and second sides 16, 18 has a thickness $T_C$ which is less than the maximum overall thickness $T_M$. As used herein, the first and second side portions 16, 18 are intended to refer to the side portions of the elongated shaped strip prior to application through the curling die that extend parallel to the longitudinal length L and parallel to the width W.

For example, the elongated shaped strip 12 may include a first 16 and a second 18 side portion disposed at generally opposite ends of the elongated shaped strip 12 and a central portion 20 disposed generally between the first and second side portions 16, 18. The central portion 20 may include a top and a bottom portion 22, 24 and the first and second side portions 16, 18 may include an upper and a lower generally planar outer surface 17, 19. The upper and lower surfaces 17, 19 may be substantially parallel to each other and may be provided with a first and a second cross-section thickness $T_{S1}$, $T_{S2}$, respectively, in which at least one of the first and second cross-section thicknesses $T_{S1}$, $T_{S2}$ is greater than a cross-sectional thickness $T_C$ of at least part of the central portion 20 of the strip 12. While various configurations of the elongated shaped strip 12 are illustrated and described herein, those skilled in the art will recognize that the elongated shaped strip 12 may be provided with a variety of non-rectangular shaped configurations which are considered within the scope of the present disclosure provided that at least a portion disposed between the first and second sides 16, 18 has a thickness $T_C$ which is less than the maximum overall thickness $T_M$ of the elongated shaped strip 12.

By way of example, the elongated shaped strip 12a, as shown in FIG. 2A, may include a central portion 20 comprising a bottom portion 24 having a substantially planar surface 25 extending substantially perpendicularly from the upper and lower surfaces 17, 19 of the first and second side portions 16, 18. The top portion 22 may include a generally concaved surface 23. For example, the top portion 22 may include a first and at least a second section 30, 32 extending from the upper and lower surfaces 17, 19 of the first and second side portions 16, 18 at a first and a second acute angle $\alpha_1$ and $\alpha_2$, respectively, and converging together at a point somewhere within the central portion 20. The point at which the first and second sections 30, 32 meet may have thickness $T_C$, though the minimum thickness $T_C$ may also be located elsewhere. While the first and second sections 30, 32 are shown converging together about the middle of the central portion 20, the first and second sections 30, 32 may converge together at any point between the first and second side portions 16, 18. Additionally, while the first and second sections 30, 32 are shown in FIG. 2A generally linearly converging together, one or more of the first and second sections 30, 32 may nonlinearly converge together as generally shown in FIG. 2B.

Referring now to FIG. 2C, another elongated shaped strip 12c is shown. The elongated shaped strip 12c may be substantially similar to the elongated shaped strip 12a as shown in FIG. 2A. One or more of the first and second side portions 16, 18 may include extended regions 34, 36 extending generally towards the other side. For example, the first and second side portions 16, 18 may each include extended regions 34, 36 extending generally perpendicularly from the upper and lower surfaces 17, 19. The first and second sections 30, 32 may form a generally concaved surface 23 wherein the first and second sections 30, 32 extend from the extended regions 34, 36 of the first and second side portions 16, 18 at a first and a second acute angle $\alpha_1$ and $\alpha_2$, respectively, and converge together about the central portion 20. While the first and second sections 30, 32 are shown in FIG. 2C generally linearly converging together, one or more of the first and second sections 30, 32 may nonlinearly converge together as generally shown in FIG. 2D.

By way of example only, an elongated strip 12 consistent with the embodiment shown in FIG. 2C may include extended regions 34, 36 of approximately 0.035"end portions 16, 18 having a thickness $T_{S1}$, $T_{S2}$ of about 0.016" and the center of the elongated shaped strip 12 at the thinnest point may have a minimum thickness $T_C$ of about 0.012". The elongated shaped strip 12 may require about 10% less material than a conventional rectangularly shaped strip having a constant thickness of about 0.016" across the entire width, resulting in significant cost savings while still meeting UL standards.

Referring now to FIG. 2E, yet another elongated shaped strip 12e is shown. The elongated shaped strip 12e may include a top portion 22 substantially similar to at least one of FIGS. 2A, 2B, 2C and/or 2D. The bottom portion 24 may also include a generally concaved surface 25. For example, the bottom portion 24 may include a third and at least a fourth section 40, 42 extending from the first and second side portions 16, 18. As shown, the third and fourth sections 40, 42 may extend generally outwardly from the upper and lower surfaces 17, 19 of the first and second side portions 16, 18 at a third and a fourth acute angle $\alpha_3$ and $\alpha_4$, respectively, and converge together about the central portion 20 in a manner similar to the top portion 22 as shown and described in FIG. 2A. While the third and fourth sections 40, 42 are shown converging together about the center of the central portion 20, the third and fourth sections 40, 42 may converge together at any point between the first and second side portions 16, 18. Additionally, while the third and fourth sections 40, 42 are shown generally linearly converging together, one or more of the third and fourth sections 40, 42 may nonlinearly converge together in a manner similar to the top portion 22 as shown and described in FIG. 2B. Moreover, the third and fourth sections 40, 42 may extend generally outwardly from respective extended regions (not shown) in a manner similar to the top portion 22 as shown and described in FIGS. 2C and 2D.

The top portion 22 and/or the bottom portion 24 of the elongated shaped strip 12f, FIG. 2F, may include a plurality of notched regions 50a-50n in which the cross-sectional thickness $T_C$ of the notched regions 50a-50n is less than at least one of the first and second cross-section thicknesses $T_{S1}$, $T_{S2}$ of the at least one of the first and second side portions 16, 18. The plurality of notched regions 50a-50n may be evenly or unevenly spaced across the width W of the elongated shaped strip 12f.

Figure 2G:
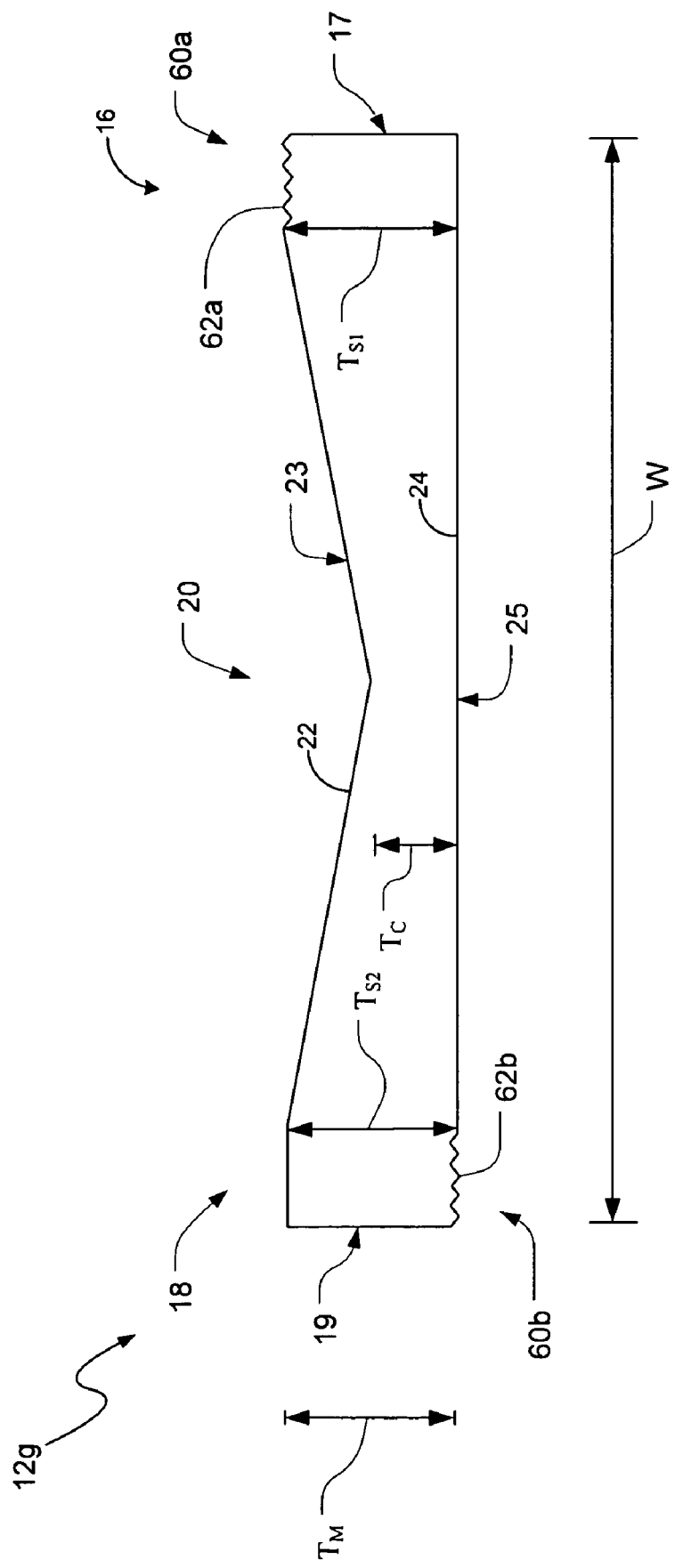
FIG. 2G is a cross-sectional view of a shaped metallic strip for forming flexible metal cable having interlocking portions consistent with the present disclosure.

The elongated shaped strip 12g, FIG. 2G, in any of the embodiments described above may also include one or more interlocking portions 60a, 60b, for example, disposed on the first and second side portions 16, 18 respectively. The interlocking portions 60a, 60b may include a plurality of ribs, protrusion, grooves, threads or the like 62a, 62b configured to increase the convolution-to-convolution frictional engagement when the elongated shaped strip 12g is wound together as generally shown in FIG. 1, thereby increasing resistance to axial forces that could cause convolution disengagement (pulling apart). The interlocking portions 60a, 60b may also be disposed about the top and/or bottom portions 22, 24 of the elongated shaped strip 12g.

While various configurations of the elongated shaped strip 12 have been described herein, those skilled in the art will recognize that other configurations of the elongated shaped strip 12 consistent with the present disclosure are also possible and are considered within the scope of the present disclosure. The elongated shaped strip 12 according to the present disclosure may have a width W and a maximum overall cross-sectional thickness $T_M$, wherein at least a portion disposed between the first and second sides 16, 18 having a cross-sectional thickness $T_C$ which is less than the maximum overall thickness $T_M$. For example, the thickness $T_{S1}$, $T_{S2}$ of at least one of the first and second sides 16, 18 may be greater than a thickness $T_C$ of a portion disposed between the first and second sides 16, 18.

Figure 3:
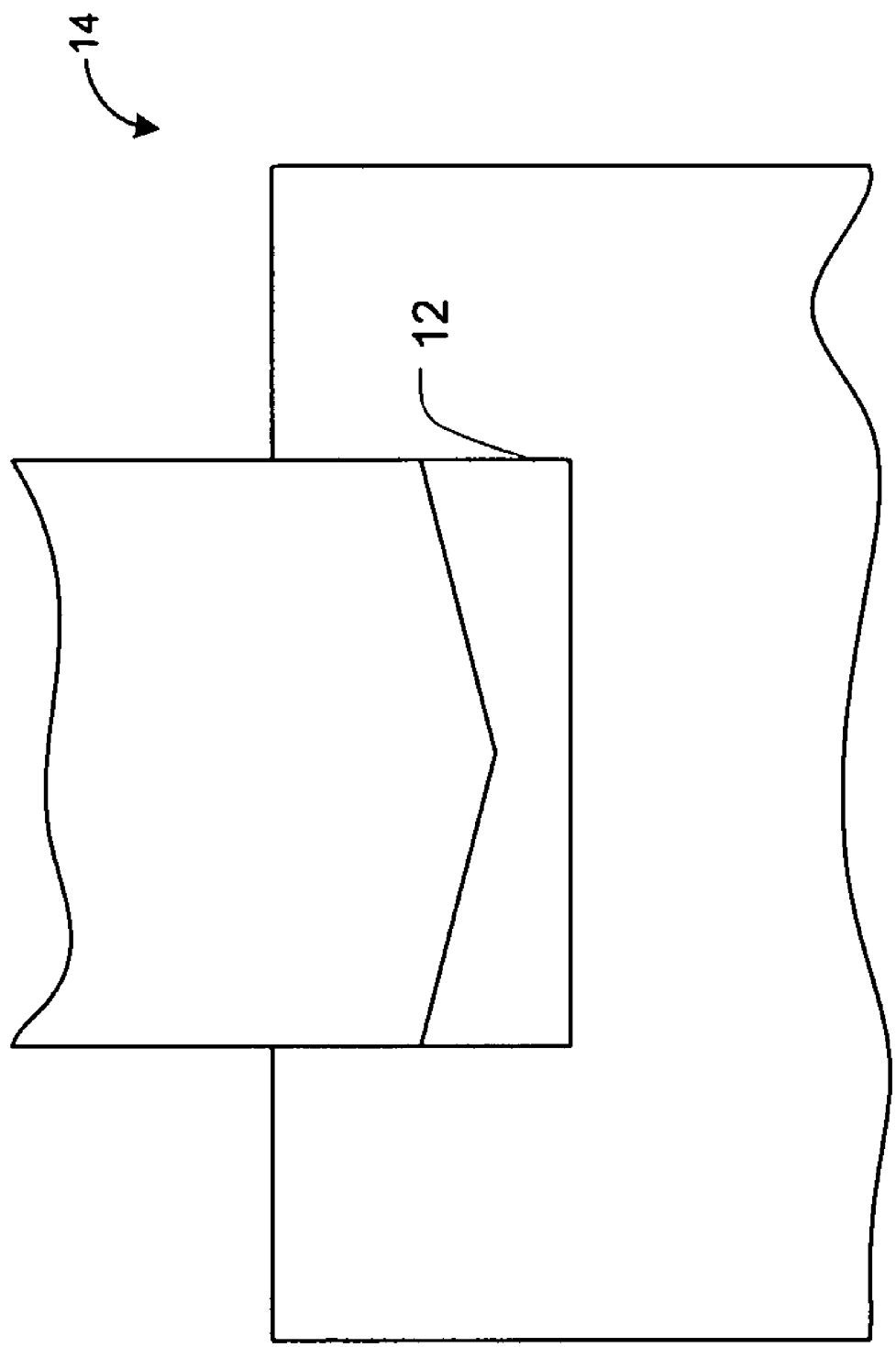
FIG. 3 schematically illustrates one embodiment of a box-pass mill stand for forming an elongated flexible strip consistent with the present disclosure.

The elongated shaped strips 12 described herein may be formed into a flexible cable 10 as generally shown in FIG. 1 by passing the elongated shaped strip 12 through a box-pass mill stand tooling 14 such as shown in FIG. 3. In one embodiment, a stripping element may be provided on the underside of the box-pass mill 14 to pry the strip out of the flanges as the rolling is performed. The box-pass mill 14 may roll or distort a portion of the elongated shaped strip 12 to form first and second oppositely directed end portions as will be described below. Additionally, the interlocking portions 60a, 60b described in FIG. 2G may be formed in the elongated shaped strip 12 using the box-pass mill stand tooling as shown in FIG. 3.

Referring to FIG. 4, a cross-section of a flexible cable 10 comprising one embodiment of a elongated shaped strip 12 consistent with the present disclosure is shown. The flexible cable 10 may include an elongated shaped strip 12 which is helically wrapped around itself along the length L of the flexible cable 10. The elongated shaped strip 12 may include first and second oppositely directed end portions 66, 68 spaced by an intermediary portion 70 extending directly between the end portions 66, 68. The first and second oppositely directed end portions 66, 68 may at least partially overlap and engage each other along the length L of the flexible cable 10. As can be seen, the central portion 20 of the elongated shaped strip 12 may include a thickness $T_C$ which is less than the maximum overall thickness $T_M$ of the elongated shaped strip 12.

The flexible cable 10, FIG. 5, may also include a elongated shaped strip 12 having interlocking portions 60a, 60b. As can be seen, when the elongated shaped strip 12 is wound around itself, the interlocking portions 60a, 60b may engage each other and increase the convolution-to-convolution frictional engagement of the flexible cable 10.

Figure 6:
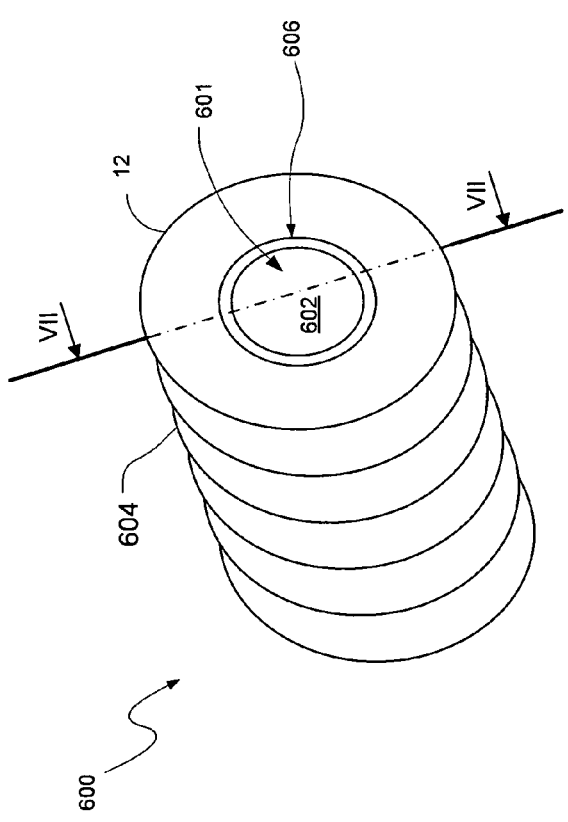
FIG. 6 is a perspective view of one embodiment of a heat exchanger tube assembly consistent with the present disclosure.

Turning now to FIG. 6, there is illustrated an exemplary heat exchanger tube assembly 600 consistent with one aspect of the present disclosure. In general, the heat exchanger tube assembly 600 facilitates heat transfer between a first heat transfer medium within and/or flowing through a passageway 601 in a heat exchanger tube 602 and a second heat transfer media surrounding and/or flowing over or around the heat exchanger tube assembly 600. The first heat transfer medium and the second heat transfer medium may be fluid heat transfer mediums, such as gasses, liquids, etc. Furthermore, the first heat transfer medium within the heat exchanger tube 602 may be different than the second heat transfer medium moving or flowing over and/or around the heat exchanger tube assembly 600.

As shown, an initial heat exchanger tube assembly 600 may generally include a tube 602 including at least one helically arranged metallic strip 604 coupled to the exterior surface 606 of the heat exchanger tube 602. The metallic strip 604 may include at least one of the elongated shaped strips 12 described above and may be a separate component which may be attached to the exterior surface 606 of the heat exchanger tube 602, e.g., by welding, brazing, swaging into a groove in the tube, etc. Alternatively, the elongated shaped strip 12 may be integrally formed with the heat exchanger tube 602. In either case, the elongated shaped strip 12 may serve to increase the surface area of the heat exchanger tube assembly 600 to increase the heat transfer. The elongated shaped strip 12 may be made from a material having either a higher or lower thermal conductivity compared to the heat exchanger tube 602.

According to another embodiment, the metallic strip 604 may be either an elongated shaped strip 12, e.g. as shown in FIG. 2, or a conventional metallic strip that is high-frequency welded in a helical fashion around the exterior surface 606 of the heat exchanger tube 602. In one embodiment, the heat exchanger tube 602 and metallic strip 604 may be formed from copper or a copper alloy, such as a copper-nickel alloy. The process of high frequency welding is known. Examples of high frequency welding processes are provided, for example, in U.S. Pat. Nos. 4,081,648, 4,233,484 and 6,037,556, the teachings of which are incorporated herein by reference.

High frequency welding of the metallic strip 604 around the heat exchanger tube 602 may result in an uneven interface between the exterior surface 606 of the heat exchanger tube 602 and the metallic strip 604, e.g. resulting from spatter in the high frequency welding, uneven melting of the surfaces, etc. The uneven interface may create turbulence in the second heat transfer medium that results in improved heat transfer compared to known methods wherein a uniform interface is provided. According to one aspect of the present disclosure therefore, there is provided a method of forming a heat exchanger tube assembly 600, said method including: providing a heat exchanger tube 602 including copper; and high frequency welding a metallic strip 604 including copper on an exterior surface 606 of said heat exchanger tube 602 in a helical configuration, allowing an uneven interface to be formed between said exterior surface 606 of the heat exchanger tube 602 and said metallic strip 604.

Figure 7:
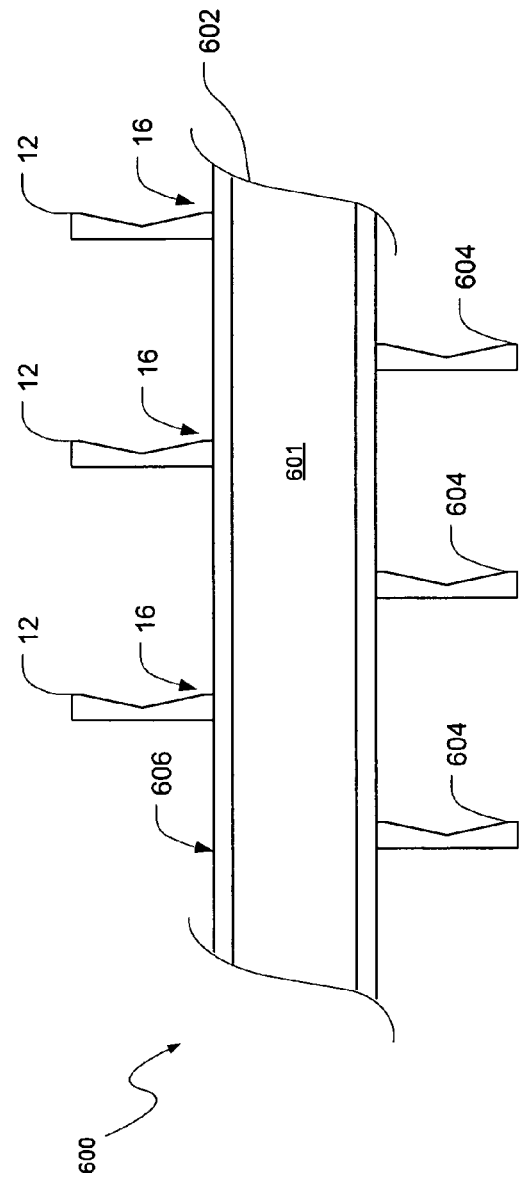
FIG. 7 is a cross-sectional view of the heat exchanger tube assembly of FIG. 6 taken along lines VII-VII.

Turning now to FIG. 7, a cross-section of the heat exchanger tube assembly 600 of FIG. 6 is shown taken along lines VII-VII. As can be seen, the heat exchanger tube assembly 600 may include a metallic strip 604 (such as, but not limited to, one or more of the elongated shaped strips 12 described above) coupled to and extending generally outwardly from the outer surface 606 of the heat exchanger tube 602. As shown, a first side portion 16 of the metallic strip 604 may be coupled to the outer surface 606 of the heat exchanger tube 602, though other portions of the metallic strip 604 may be coupled to the outer surface 606 of the heat exchanger tube 602. While the metallic strip 604 is shown extending generally perpendicularly outwardly from the outer surface 606 of the heat exchanger tube 602, the metallic strip 604 may extend generally outwardly from the outer surface 606 of the heat exchanger tube 602 at other angles greater than or less than 90 degrees.

The present disclosure herein has been set for the through the description of various embodiments consistent therewith. It should be recognized that any aspect or feature of any embodiment described herein may be used in combination with any other aspects or features of the various embodiments. In addition, a heat exchanger tube including a shaped fin consistent with the present invention may be incorporate any aspect or feature of any embodiment described in PCT application Ser. No. PCT/US2005/042183, filed Nov. 18, 2005 and published on May 26, 2006 as International Publication No. WO 2006/055916, the teachings of which are hereby incorporated herein by reference. The described embodiments are susceptible to numerous modifications and variations without departing from the invention herein, and should therefore not be construed as limiting the invention.

According to one aspect, the present disclosure may provide a flexible conduit comprising an elongated shaped strip.

The elongated shaped strip may include a central portion disposed between a first and a second end portion. The first and second end portions may extend generally outwardly from the central portion in generally opposite directions from each other. At least a portion of the central portion may include a cross-sectional thickness $T_C$ which is less than a maximum cross-sectional thickness $T_M$ of the elongated shaped strip. The elongated shaped strip may be helically wound around itself and configured to form a generally tubular body.

According to another aspect, the present disclosure may provide a method of forming a flexible conduit comprising providing an elongated flexible strip having a central portion disposed between a first and a second end portion, the first and second end portions extending generally outwardly from the central portion in generally opposite directions from each other, wherein at least a portion of the central portion includes a cross-sectional thickness $T_C$ which is less than a maximum cross-sectional thickness $T_M$ of the elongated shaped strip. The first end portion may be rolled in a first direction and the second end portion may be bent in a second direction generally opposite the first direction to form a shaped flexible strip. The shaped flexible strip may be helically wound strip upon itself.

According to yet another aspect, the present disclosure may provide a flexible cable comprising a flexible conduit and at least one conductor. The flexible cable may include an elongated shaped strip having a central portion disposed between a first and a second end portion. The first and second end portions may extend generally outwardly from the central portion in generally opposite directions from each other. At least a portion of the central portion may include a cross-sectional thickness $T_C$ which is less than a maximum cross-sectional thickness $T_M$ of the elongated shaped strip. The elongated shaped strip may be helically wound around itself and configured to form a generally tubular body having at least one interior passageway. The conductor may be at least partially disposed within the interior passageway of the generally tubular body.

According to a further aspect, the present disclosure may provide a heat exchanger tube assembly comprising a tube and an elongated shaped strip. The tube may include a length, an inner surface defining a passageway and an outer surface. The elongated shaped strip may be helically coupled to the outer surface of the tube along at least a portion of the length of the tube. The elongated shaped strip may include a central portion disposed between a first and a second end portion in which the first and the second end portions extend generally outwardly from the central portion on generally opposite sides of the central portion. At least a portion of the central portion may include a cross-sectional thickness $T_C$ which is less than a maximum cross-sectional thickness $T_M$ of the elongated shaped strip.

As mentioned above, the present disclosure is not intended to be limited to a system or method which must satisfy one or more of any stated or implied object or feature of the present disclosure and should not be limited to the preferred, exemplary, or primary embodiment(s) described herein. The foregoing description of a preferred embodiment of the present disclosure has been presented for purposes of illustration and description. It is not intended to be exhaustive or to limit the present disclosure to the precise form disclosed. Obvious modifications or variations are possible in light of the above teachings. The embodiment was chosen and described to provide the best illustration of the principles of the present disclosure and its practical application to thereby enable one of ordinary skill in the art to utilize the present disclosure in various embodiments and with various modifications as is suited to the particular use contemplated. All such modifications and variations are within the scope of the present disclosure as determined by the claims when interpreted in accordance with breadth to which they are fairly, legally and equitably entitled.

What is claimed is:

1. A flexible conduit comprising:
    an elongated shaped metallic strip, said elongated shaped metallic strip including a central portion disposed between a first and a second end portion, said first and said second end portions extending generally outwardly from said central portion on generally opposite sides of said central portion and including first and second planar outer surfaces of said strip, respectively, wherein at least a portion of said central portion includes a cross-sectional thickness $T_C$ which is less than a maximum cross-sectional thickness $T_M$ of said elongated shaped strip, said elongated shaped strip being helically wound around itself and configured to form a generally tubular body,
    said central portion including a top and a bottom surface extending from said first and said second planar outer surfaces of said strip, at least a portion of at least one of said top and said bottom surfaces including a generally concaved region, said concaved region including a first and a second section extending from one of said first and said second planar outer surfaces of said strip at a first and a second acute angle $\alpha_1$ and $\alpha_2$, respectively, wherein said first and said second sections converge together at a point between said first and said second planar outer surfaces.

2. The flexible conduit of claim 1, wherein at least a portion of said concaved region includes said cross-sectional thickness $T_C$.

3. The flexible conduit of claim 1, wherein said first and said second sections generally linearly converge together at a point defining said cross-sectional thickness $T_C$.

4. The flexible conduit of claim 1, wherein said first and said second sections generally nonlinearly converge together at a point defining said cross-sectional thickness $T_C$.

5. The flexible conduit of claim 1, wherein said central portion includes a top and a bottom surface defining at least a portion of an inner and outer surface of said flexible conduit, respectively, wherein at least a portion of said top surface includes said generally concaved region.

6. The flexible conduit of claim 1, wherein said central portion includes a top and a bottom surface defining at least a portion of an inner and outer surface of said flexible conduit, respectively, wherein at least a portion of said bottom surface includes said generally concaved region.

7. The flexible conduit of claim 1, wherein said first end portion includes a first cross-section thickness $T_{S1}$ and said end portion includes a second cross-section thickness $T_{S2}$, wherein at least one of said first and said second cross-section thicknesses $T_{S1}$, $T_{S2}$ is greater than said cross-sectional thickness $T_C$ of at least part of said central portion.

8. A flexible cable comprising:
    a flexible conduit comprising an elongated metallic shaped strip, said elongated metallic shaped strip including a central portion disposed between a first and a second end portion extending generally outwardly from said central, said first and said second end portions including first and second planar outer surfaces, respectively, wherein at least a portion of said central portion includes a cross-sectional thickness $T_C$ which is less than a maximum cross-sectional thickness $T_M$ of said elongated shaped strip, said elongated shaped strip being helically wound around itself and configured to form a generally tubular body having at least one interior passageway; and at least one conductor at least partially disposed within said least one interior passageway of said generally tubular body;

said central portion including a top and a bottom surface extending from said first and said second planar outer surfaces of said strip, at least a portion of at least one of said top and said bottom surfaces including a generally concaved region having said cross-sectional thickness $T_C$, wherein said generally concaved region includes a first and a second section extending from one of said first and said second planar outer surfaces of said strip at a first and a second acute angle $\alpha_1$ and $\alpha_2$, respectively, and wherein said first and said second sections converge together at a point between said first and said second planar outer surfaces.

9. The flexible cable of claim 8 wherein said at least one conductor includes at least one optical fiber.

10. The flexible cable of claim 8 wherein said at least one conductor includes at least one insulated electrical conductor.

11. The flexible cable of claim 8, wherein said first end portion includes a first cross-section thickness $T_{S1}$ and said end portion includes a second cross-section thickness $T_{S2}$, wherein at least one of said first and said second cross-section thicknesses $T_{S1}$, $T_{S2}$ is greater than said cross-sectional thickness $T_C$ of at least part of said central portion.

12. A heat exchanger tube assembly comprising:

a tube having a length, an inner surface defining a passageway and an outer surface; and an elongated metallic shaped strip helically coupled to said outer surface of said tube along at least a portion of said length of said tube, said elongated metallic shaped strip including a central portion disposed between a first and a second end portion, said first and said second end portions extending generally outwardly from said central portion on generally opposite sides of said central portion and including first and second planar outer surfaces of said strip, respectively, wherein said central portion includes a top and a bottom surface extending from said first and said second planar outer surfaces of said strip, and wherein at least a portion of at least one of said top and said bottom surfaces includes a generally concaved region, said concaved region including a first and a second section extending from one of said first and said second planar outer surfaces of said strip at a first and a second acute angle $\alpha_1$ and $\alpha_2$, respectively, and wherein said first and said second sections converge together at a point between said first and said second planar outer surfaces such that at least a portion of said central portion includes a cross-sectional thickness $T_C$ which is less than a maximum cross-sectional thickness $T_M$ of said elongated shaped strip.

13. The heat exchanger tube assembly of claim 12, wherein at least a portion of at least one of said top and said bottom surfaces includes a generally concaved region having said cross-sectional thickness $T_C$.

* * * * *